United States Patent
Lavi et al.

(10) Patent No.: US 11,656,362 B2
(45) Date of Patent: May 23, 2023

(54) SYSTEM AND METHOD FOR PROVIDING CYBER SECURITY FOR SATELLITE-BASED NAVIGATION SYSTEMS

(71) Applicant: Tupaia Ltd., Ramat-Hasharon (IL)

(72) Inventors: Nadav Lavi, Ramat-Hasharon (IL); Kobi Scheim, Pardess-Hanna (IL)

(73) Assignee: TUPAIA LTD., Ramat-Hasharon (IL)

( * ) Notice: Subject to any disclaimer, the term of this patent is extended or adjusted under 35 U.S.C. 154(b) by 193 days.

(21) Appl. No.: 17/099,169

(22) Filed: Nov. 16, 2020

(65) Prior Publication Data

US 2021/0149058 A1 May 20, 2021

Related U.S. Application Data

(60) Provisional application No. 62/937,820, filed on Nov. 20, 2019.

(51) Int. Cl.
*G01S 19/21* (2010.01)
*H04W 12/122* (2021.01)

(52) U.S. Cl.
CPC .......... *G01S 19/21* (2013.01); *G01S 19/215* (2013.01); *H04W 12/122* (2021.01)

(58) Field of Classification Search
CPC ........ G01S 19/03; G01S 19/08; G01S 19/074; G01S 19/21; G01S 19/215; H04W 12/122
See application file for complete search history.

(56) References Cited

U.S. PATENT DOCUMENTS

| | | | | |
|---|---|---|---|---|
| 7,512,492 B2* | 3/2009 | Irvin | ...... | G01S 19/21 |
| | | | | 701/473 |
| 8,094,068 B2* | 1/2012 | Trautenberg | ...... | G01S 19/08 |
| | | | | 342/357.45 |
| 9,185,516 B2* | 11/2015 | Fischer | ...... | H04W 4/02 |
| 9,466,881 B1* | 10/2016 | Berry | ...... | G01S 19/03 |
| 10,281,583 B2* | 5/2019 | Leibner | ...... | G01S 19/215 |
| 2004/0257275 A1* | 12/2004 | Yee | ...... | G01S 5/02 |
| | | | | 342/357.59 |
| 2014/0232595 A1* | 8/2014 | Rife | ...... | G01S 19/03 |
| | | | | 342/357.58 |
| 2017/0070971 A1* | 3/2017 | Wietfeldt | ...... | H04W 24/10 |
| 2018/0299560 A1* | 10/2018 | Zangvil | ...... | G01S 19/215 |
| 2020/0379122 A1* | 12/2020 | Tontiruttananon | ...... | H04K 3/65 |

(Continued)

FOREIGN PATENT DOCUMENTS

DE 102014218081 A1 * 3/2016 ............ G01S 19/03

OTHER PUBLICATIONS

DE-102014218081-A1 (English Translation). 2016.*
(Continued)

*Primary Examiner* — Gregory C. Issing
(74) *Attorney, Agent, or Firm* — M&B IP Analysts, LLC

(57) ABSTRACT

A system and method for detecting cyber-attacks. The method includes receiving satellite data from at least one satellite orbiting at a location of a ground-level sensor. The satellite data is received from the ground-level sensor. The method also includes determining whether the received satellite data is valid, and upon determining that the received satellite data is invalid, extracting a list of GNSS devices in a region where the ground-level sensor is deployed, and alerting each GNSS device in the list of GNSS devices on a potential cyber-attack.

20 Claims, 7 Drawing Sheets

(56) References Cited

U.S. PATENT DOCUMENTS

2021/0258756 A1* 8/2021 Mcdougall .............. H04W 4/90

OTHER PUBLICATIONS

Bauernfeind et al . "In-Car Jammer Interference Detection in Automotive GNSS Receivers and Localization by Means of Vehicular Communication." 2011 IEEE Forum on Integrated and Sustainable Transportation Systems. Vienna, Austria. pp. 376-381. (Year: 2011).*

"The EU Cybersecurity Act", The EU Cybersecurity Act, Shaping Europe's Digital Future, Nov. 16, 2020.

Trump, Donald J., "Executive Order on Strengthening National Resilience through Responsible Use of Positioning, Navigation, and Timing Services", The White House: Infrastructure & Technology, Issued: Feb. 12, 2020.

* cited by examiner

SYSTEM AND METHOD FOR PROVIDING CYBER SECURITY FOR SATELLITE-BASED NAVIGATION SYSTEMS

CROSS-REFERENCE TO RELATED APPLICATIONS

This application claims the benefit of U.S. Provisional Application No. 62/937,820, filed on Nov. 20, 2019, the contents of which are hereby incorporated by reference.

TECHNICAL FIELD

The present disclosure relates generally to a system and method for providing cyber-security. More specifically, the present disclosure is directed to a system and method that detect, alert, and assist against cyber-attacks on satellite-based navigation systems.

BACKGROUND

Global navigation by satellite systems (GNSS) have become an important element of the modern life, with applications use-cases in numerous domains: transportation, sport, navigation, asset monitoring and more. Nowadays GNSS includes several satellites constellations operated by the US (GPS/NAVSTAR), Russia (Glonass), EU (Galileo), China (Beidou) and Japan (QZSS), where the last system is relatively local and provides coverage for Asia-Oceania region.

A GNSS positioning system is based on three segments: (a) space segment, (b) control segment, and (c) user segment. While the first two are managed by national agencies and therefore very consolidated, the third segment is usually commercial with large variation in equipment, usage, and applications. GNSS positioning relies on the ability to synchronize in time to an accurate signal source (i.e., the satellites) with a known position by relatively simple receiver at the user side providing time propagation estimation to several satellites concurrently. Once ranging is measured, position of the user receiver is derived by triangulating the measured ranges with respect to the satellite's location. To complete this high-level concept, the receiver knows the satellites position in time and space by decoding a set of parameters broadcasted by the satellites that describe the satellites location ephemerides. A benefit of deriving of receiver position is that it allows for the correction of the receiver clock with global clock coordinates resulting in extremely high accuracy (i.e., to a level of a few nanoseconds).

Since GNSS is based on wireless signals transmitted from satellites in space, it is susceptible to various radio-frequency (RF) based cyber-attacks. These cyber-attacks may disable the users' ability to use the technology, or lead the users to experience erroneous operation without the users knowing.

There are several types of potential attacks: (a) jamming, in which entire GNSS system frequency range is blocked, (b) satellite injection, in which satellite-like signals are transmitted using a new (bogus) satellite identification, (c) satellite injection using an existing satellite identification that is currently not received in the region, and (d) satellite spoofing, in which a signal is transmitted in a manner that overcomes the signal of a correct and existing satellite. A standard GNSS receiver cannot detect or mitigate such attacks, as the attack RF signals are identical to the satellites' transmitted signals. Also, alternative solutions addressing these types of attacks are based on antenna systems, such as antenna arrays, which are limited in their capabilities and in their applicability to all range of devices. For example, integrating antenna array in a small user device (smartphone) or a car-navigation system is not feasible. Therefore, existing antenna-based systems cannot defend such device against satellite based cyber-attacks. Thus, a more cost effective and flexible solution is required.

In view of the above discussion, there is a need for a cyber-attack detection and mitigation system that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for detecting a cyber-attack. The method includes receiving satellite data from at least one satellite orbiting at a location of a ground-level sensor. The satellite data is received from the ground-level sensor. The method also includes determining whether the received satellite data is valid, and upon determining that the received satellite data is invalid, extracting a list of GNSS devices in a region where the ground-level sensor is deployed, and alerting each GNSS device in the list of GNSS devices on a potential cyber-attack.

Certain embodiments disclosed herein also include a non-transitory computer readable medium having stored thereon causing a processing circuitry to execute a process, the process includes receiving satellite data from at least one satellite orbiting at a location of a ground-level sensor. The satellite data is received from the ground-level sensor. The method also includes determining whether the received satellite data is valid, and upon determining that the received satellite data is invalid, extracting a list of GNSS devices in a region where the ground-level sensor is deployed, and alerting each GNSS device in the list of GNSS devices on a potential cyber-attack.

Certain embodiments disclosed herein also include a system for detecting a cyber-attack. The system includes: a processing circuitry; and a memory, the memory containing instructions that, when executed by the processing circuitry, configure the system to receive satellite data from at least one satellite orbiting at a location of a ground-level sensor. The satellite data is received from the ground-level sensor. The system is also configured to determine whether the received satellite data is valid, and upon determining that the received satellite data is invalid, extract a list of GNSS devices in a region where the ground-level sensor is deployed, and alert each GNSS device in the list of GNSS devices on a potential cyber-attack.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
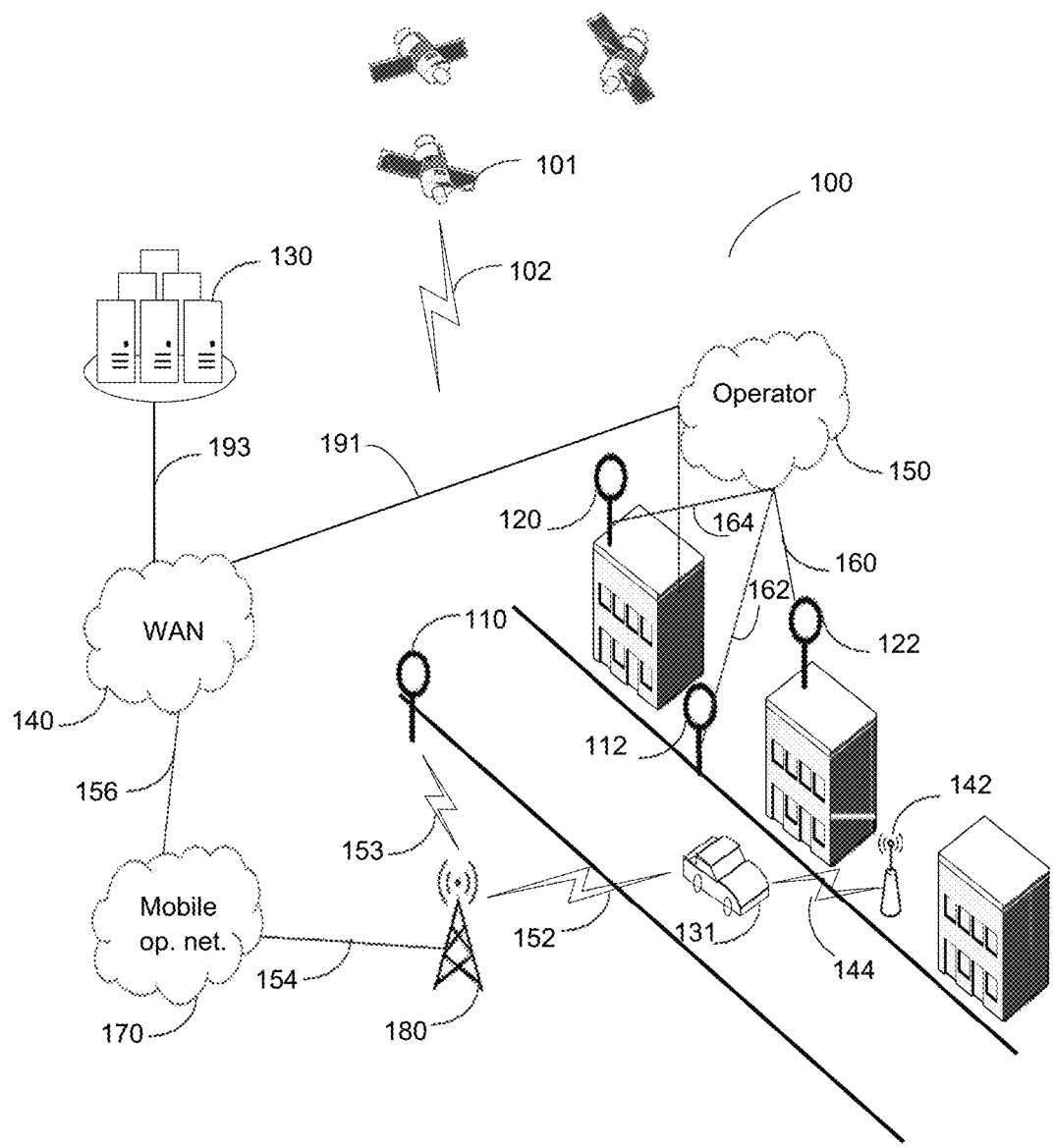
FIG. 1 is an example diagram of an example network system for providing cyber security for satellite-based navigation system utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for providing cyber security for satellite-based navigation systems. First, data is received from a satellite from a sensor, and it is determining whether various parameters of the received data are valid, including the satellite's SVID, location, time stamping, and the satellite signal's Signal-to-Noise Ratio (SNR). Upon determining that the received data is invalid, a list of GNSS devices in a region is extracted, and the GNSS devices are alerted of a cyber-attack. Also, the alerted GNSS devices may be instructed to mitigate the cyber-attack. In an embodiment, a sensor is a standard GNSS receiver.

That is, a sensor-based system for the detection of RF based cyber-attacks on GNSS is described. In embodiment, deployment the sensors are distributed in a single type of layer formation in ground level. In another embodiment, the sensors are distributed in two types of layers, one layer is at the ground level and the second one is above ground level. Additionally, methods to detect RF based cyber-attacks on GNSS, alert GNSS devices, and mitigate the attacks are disclosed.

FIG. 1 shows an example diagram of an example network system 100 for providing cyber security for satellite-based navigation system utilized to describe the various disclosed embodiments. With reference to FIG. 1, the network system 100 includes GNSS sensors 110,112, 120, 122 deployed in a region. The sensors 110, 112, 120, 122 may be deployed as a single layer (i.e., only on the ground level close to the GNSS end-users) as sensors 110 and 112. Another potential deployment formation is in two layers, one layer being on ground level as sensors 110 and 112, and the second layer above ground level as sensors 120 and 122, which may be deployed on rooftops.

In operation, the sensors 110, 112, 120, 122 constantly receive GNSS satellite signals 102, from different satellites 101. The sensors 110, 112, 120, 122 are connected to a detection server 130, through a network 140, either via landline/wireline operator 150 and wireline or landline communication links, 160, 162, 164, such as DSL or fiber-optic, or through a mobile operator 170, using a wireless base-station 180, and wireless link 153, such as Wi-Fi and/or cellular (e.g., 3G, 4GLTE, or 5G). The wireless base-station 180, is connected to the mobile operator 170, via wireline or wireless link 154. The network 140 may include a local area network, a Wide Area Network (WAN), the Internet, the World-Wide Web (WWW), and the like, as well as any combination thereof. The connection between the sensors and the detection server 130 may include a wired, wireless, cellular connections, or any combination thereof. The detection server 130 may be deployed on-premises or in a cloud-computing platform. The cloud-computing platform may include a public cloud, a private cloud, a hybrid cloud, or combination thereof.

The mobile operator core network 170, is connected to a wide area network 140, via communication link 156, which can be wireline or wireless or combination of both. The wireline operator network 150 is connected to a wide area network 140 via communication link 191, which can be wireline or wireless. Further, a detection server 130 is connected to the wide area network 140 via communication link 193, which can be wireline or wireless.

It is noted that in other embodiments, the network structure can be different based on the operator's availability, region topology, etc. For example, the sensors and detection server can all reside at the same network (e.g., the mobile network).

The location of the GNSS sensors 110, 112, 120, 122, may be predetermined and stored on the sensors 110, 112, 120, 122 and the detection server 130. Also, the sensors 110, 112, 120, 122 may periodically send to the detection server 130 information regarding the GNSS satellite signals 102. This information includes time of week (TOW), Signal to Noise Ratio (SNR), ranging measurements, satellite identification (termed as Space Vehicle Identification—SVID), channel number, signal ID, Received Signal Strength Indication (RSSI), Doppler measurements, satellite ephemeris data, and other physical measurements extracted from the embedded GNSS receiver within the GNSS sensor.

The detection server 130 is configured to: receive this data from the GNSS sensors 110, 112, 120, 122, store the data, process the data to create statistics of the various measurements and information (for example list of received SVID (satellites) for each sensor, and expected SNR of the satellites at certain time of day at the sensors' location).

It is important to note that the GNSS sensors 110, 112, 120, 122, are situated statically, and while a GNSS sensor can be a dedicated device deployed in a certain area. It should be noted that within a modern environment like a city or a highway there are various already deployed devices that may operate as GNSS sensors. For example, cellular base-stations, information kiosks, smart street-lights, digital signage, and more can also operate as GNSS sensors. These devices may be equipped with the required hardware to support the capabilities needed for operation of a GNSS sensor 110, 112, 120, 122. Furthermore, the location, (i.e., the exact global position) of each GNSS sensor is known to both the GNSS sensor 110, 112, 120, 122 and the detection server 130. Here, the location information may be gathered manually, where surveying teams are dispatched to conduct precise location measurements and configure the result into the system 100, or autonomously by the system 100, either locally at one of the GNSS sensors 110, 112, 120, 122 or at the detection server 130 using positioning techniques such as point-positioning, or Precise Point Positioning (PPP), or other techniques; or at a separate server handling only positioning calculations.

Further, a GNSS device 131 (a computing device equipped with GNSS receiver and antenna) is configured to receive the GNSS satellite signals 102, and is connected to a mobile operator 170 via a wireless base-station 180 over a wireless link 152. Through the mobile operator 170 the GNSS device 131 communicates with the detection server 130, for example using the TCP/IP protocol.

In FIG. 1, the GNSS device 131 is illustrated as a vehicle, yet GNSS devices are used for various applications, and thus the GNSS device 131 can be any type of computing device with GNSS capabilities, such as: mobile phones, tablets, laptops, smart watches, cellular base-stations, e-scooters, e-bikes, various types of sensors and Internet of Things (IoT) devices (for example temperature and humidity sensor), traffic lights, digital signages, information kiosks, drones, and the like.

In operation, a cyber-attack device 142 within the vicinity of the GNSS device 131, transmits RF signals 144 to prevent in-order operation of the GNSS system 100, and causes erroneous operation of GNSS end devices. The detection server 130, based on the information received from the GNSS sensors 110, 112, 120, 122 and the previous gathered information, is configured to detect a cyber-attack conducted by the cyber-attack device 142, and alert the GNSS device 131 on an occurring attack. The detection server 130 also indicates the type of attack and provides with additional information about the attack (for example, the impacted SVIDs, coarse location or coverage of the attack). Once the GNSS device 131 receives this information from the detection server 130, the GNSS device 131 conducts a set of actions to mitigate the impact of the cyber-attack. For example, the device 131 can stop using the malicious satellites signals transmitted while the attack is active. Also, for some forms of the cyber-attacks, the attack may be mitigated by taking a set of actions based on the information received from the detection server 130. In addition, the detection server 130 can alert a human user, such as law enforcement officers, fleet operator, IoT operator, and so on, about the ongoing cyber-attack.

Figure 2:
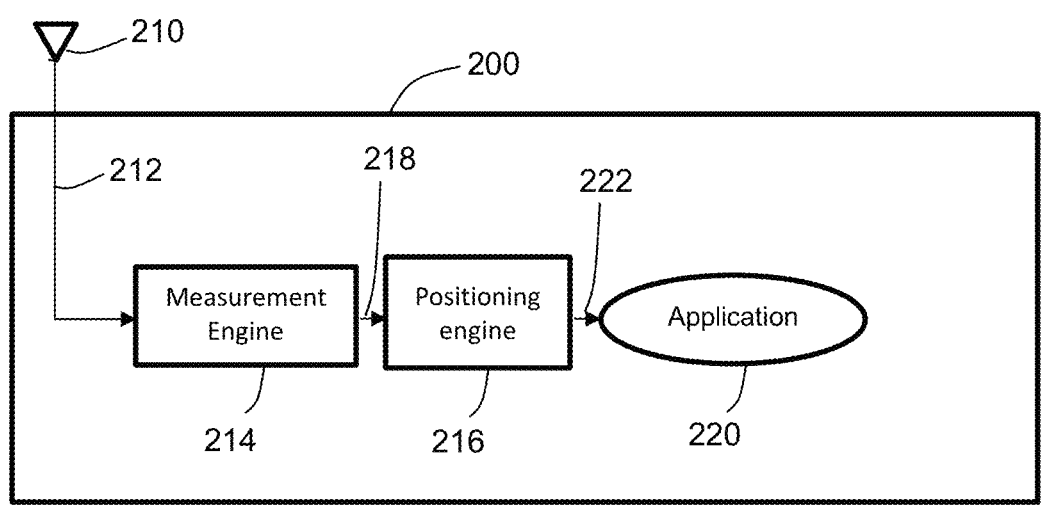
FIG. 2 is an example block diagram of a GNSS sensor, according to an embodiment.

FIG. 2 is an example block diagram of a GNSS sensor 200 designed according to an embodiment. Each of the GNSS sensors illustrated in FIG. 1 may be structured as the GNSS sensor 200. In an embodiment, the GNSS sensor 200 includes an antenna 210, an antenna interface 212, a measurement engine 214, a positioning engine 216, an interface 218, connecting an output of the measurement engine 214 to the positioning engine 216, an application 220, and an interface 222 connecting the positioning engine 216 to the application 220. In certain configurations, the positioning engine 216 and/or its functionality is embedded in the detection server 130.

The measurement engine 214 provides range and range-rate measurements based on signals received from the antenna 210 over the antenna interface 212. The positioning engine 216 determines the sensors' position based on a list of range measurements from the GNSS sensor 200 to the satellites 101, and the respective locations of the satellites 101 derived from the derived parameters of the received broadcasted satellites signal (not shown). In an embodiment, the position engine 216 may also determine calibration parameters to the location of the GNSS sensor 200.

To derive the location of the sensor 200, the positioning engine 216 may perform one or more multilateration algorithms based on the pseudo ranges measurements provided by the measurement engine 214. Here, the positioning engine 216 is configured to convert the range-rate measurements provided also by the measurement engine 214 through the interface 218 into receivers' velocity. One of ordinary skill in the art would be familiar with the multilateration algorithms. Additionally, the positioning engine 216 is configured to estimate the receiver clock bias and metrices that indicate the quality of the resulting estimates (e.g., two-dimensional root mean squared error—2dRMS, three-dimensional root mean squared error—3dRMS, Geometric dilution of precision GDOP, and the like).

The position derived by the positioning engine 216 is further transmitted through the interface 222 to an application 220. In addition to the sensor's position in an embodiment, the satellite's position which is internally computed based on the satellite's broadcasted ephemerides data, is also sent to the application that uses the location estimate of the satellites 101 for potentially: displaying the results, and controlling or communicating with other elements of the GNSS network system 100.

Further, the communication interfaces 218, 222, and other similar interfaces discussed transfer digital communication as is, or after compressing the data to be transferred. Correspondingly, the interfaces 218, 222, along with the other interfaces discussed, may decompress the data received for communication efficiency, power consumption reduction, and the like. The same may apply for wireless communication interfaces where data is transferred bidirectionally with remote entities.

Figure 3:
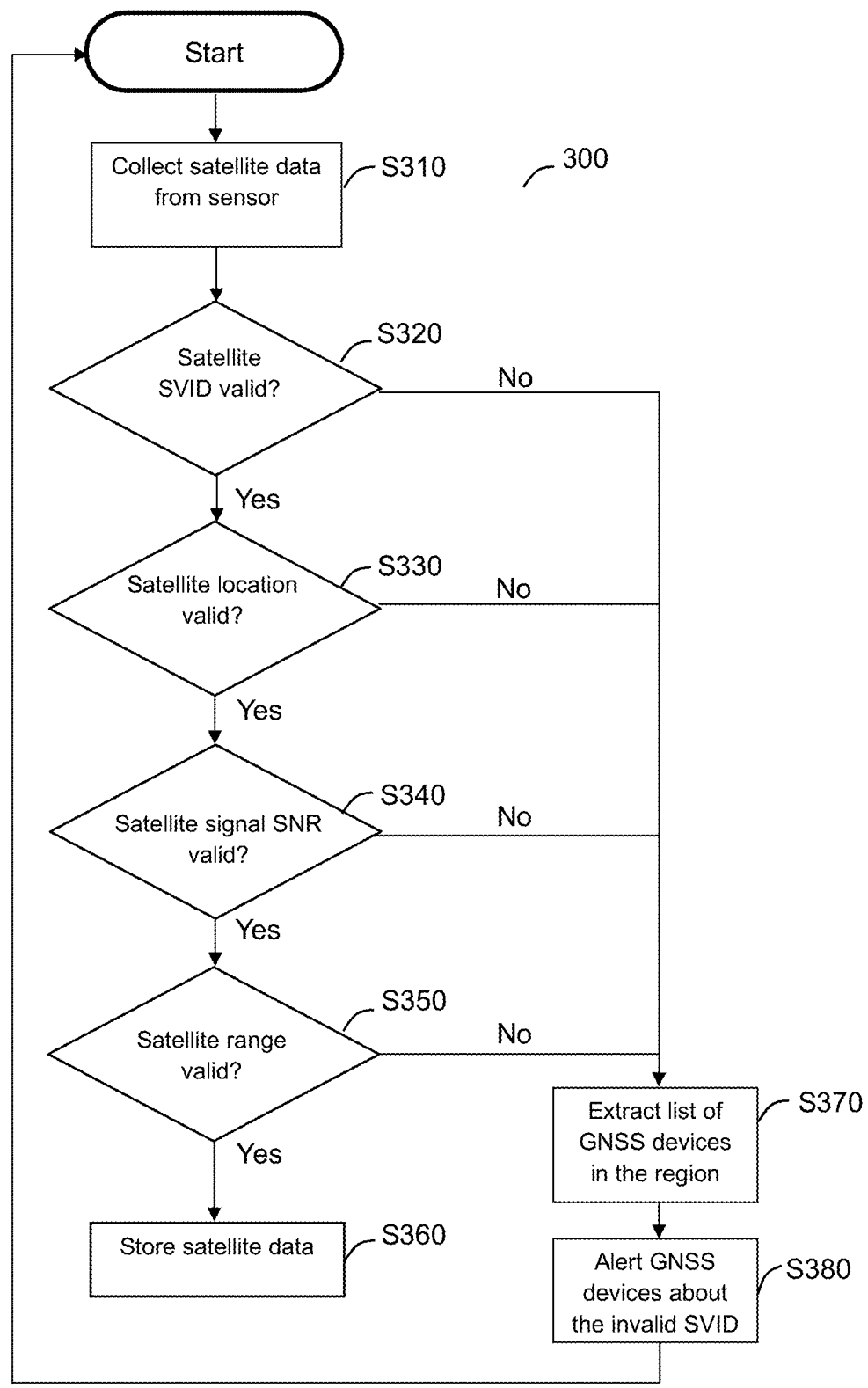
FIG. 3 is an example flowchart illustrating a method for a GNSS cyber-attack detection, according to an embodiment.

FIG. 3 is an example flowchart 300 illustrating a method for a GNSS cyber-attack detection using data from a GNSS sensor (or multiple sensors), according to an embodiment. In the embodiment, the method may be performed by the detection server 130 (FIG. 1). At S310, data from a satellite is collected from a sensor. In an embodiment, the data from the sensors is retrieved at a predefined schedule or on-demand. In yet another embodiment, the data is pulled from the sensors at a predefined schedule or on-demand.

In an embodiment, S310 may include validating the data is validated using several methods, in a per-satellite manner using the currently collected data, and previously-collected historical and statistical data from the sensor regarding the specific satellite. Then, at S320, S330 and S340, it is determined whether the received data is valid. Here, various data parameters may be used to determine whether the received data is valid, including a satellite's identification number (SVID), a satellite's location (calculated based on broadcasted ephemeris data), or a satellite's range.

That is, at S320, it is determined if the satellite's SVID is valid. Here, validity (of SVID and/or location) can be based on known statistics regarding a specific satellite (e.g., satellite reception time in the area), and based on other sensors' real-time data from other regions. If the SVID is valid, the method 300 proceeds to S330. If not, the method 300 proceeds to S370. Then, at S330, it is further determined whether the satellite's location is valid. If the satellite location is found to be valid, the method proceeds to S340. If not, the method proceeds to S370.

That is, at S330, the location of the satellite is verified in accordance with the published ephemeris. This is performed based on the satellite-broadcasted orbit parameters that are delivered to the detection server from the sensors and validated for correctness. If the satellite is not at the expected location in orbit (considering potential clock differences and satellite maneuver errors), then a cyber-attack on the satellite is detected.

At S340, it is determined if the satellite signal's Signal-to-Noise (SNR) ratio is valid. If the SVID is valid, the method 300 proceeds to S350. If not, the method 300 proceeds to S370. That is, at S340, the satellite signal SNR is verified versus previous statistics. Thus, if the currently received SNR is higher than the average received SNR above a predefined threshold (for example 3 dB), or if the currently received SNR is higher than the maximal anticipated received SNR (derived from the statistics), then a cyber-attack is detected.

At S350, it is further determined whether the satellite's range, or the satellite's distance to the sensor is valid. If the satellite range is found to be valid, the method proceeds to S360. If not, the method proceeds to S370. At S350, upon finding that the satellite's SVID, location, and range are valid, the data from the satellite is stored.

That is, at S350, the range measurement of the sensor from the satellite is compared to the gathered statistics. The range measurement needs to be computed based on the raw measurement and considering GNSS error sources, such as Ionospheric and tropospheric delay, satellite clock bias and orbit errors. These corrections are received from external source, such as third-party organizations, or derived based on dedicated algorithms and using the gathered data from the entire sensor system. If the currently computed range is higher than the average range or from the maximal range, derived from the statistics, above a certain threshold (for example above 50 meters), then a cyber-attack on the satellite is detected. If an attack was not detected, then the data is stored at S360 and incorporated into the statistics.

At S370, upon determining from the collected satellite data that any of the satellite SVID, location, signal SNR, or range is invalid, which indicate that a cyberattack is taking place, a list of GNSS devices in the region is extracted. Then, at S370, the GNSS devices are alerted of a cyber-attack, and are instructed to mitigate the cyber-attack.

That is, at S370, if an attack is detected, a list of GNSS users is composed (i.e., extracted), based on the GNSS users periodic position update, and at S380, an alert on the cyber-attack is transmitted to the GNSS devices on the list, including relevant information such as the SVID. This information assists the GNSS users to mitigate the impact of such attacks. Then, at S380, the cyber-attack detection is transmitted (e.g., broadcasted) over the cellular NW as an alert to the entire region where the cyber-attack was detected.

In an embodiment, the scale of the deployed sensor network may be leveraged, for example, by using measurements from a set of deployed sensors instead of a single sensor to detect GNSS cyber-attacks. This increases efficiency and ensures high detection rate and low false detection. Here, the sensors in the same vicinity are supposed to sense a similar environment. If an attack occurs next to a certain sensor, the impact of the attack decreases the further one moves away from the source of attack. Thus, exploring different sensors data, and comparing their sensed environment may increase the accuracy of detecting a cyber-attack source and an area of impact by the cyber-attack.

Figure 4:
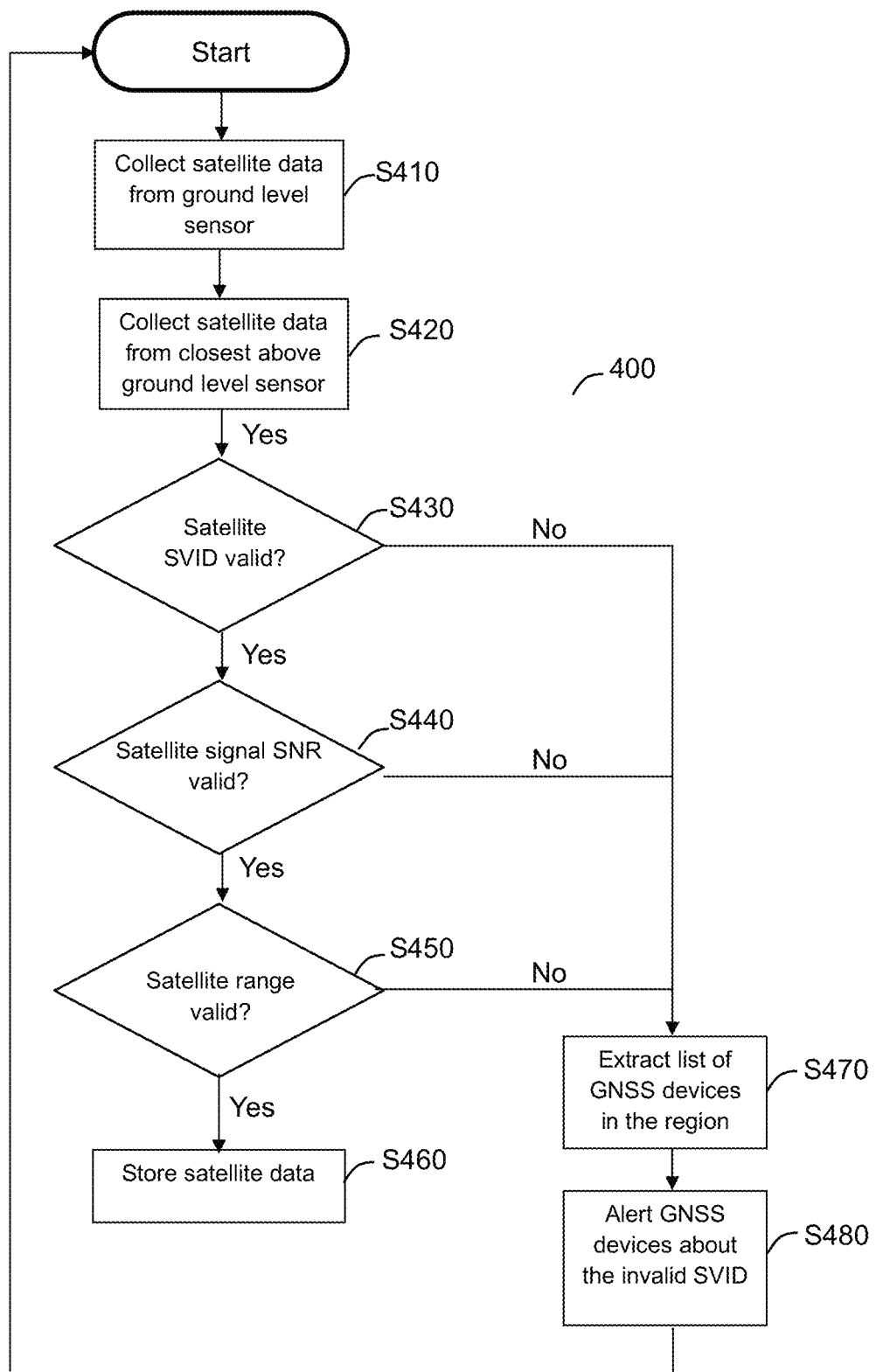
FIG. 4 is an example flowchart describing a method of detecting a GNSS cyber-attack, according to an embodiment.

FIG. 4 shows an example flowchart describing a method 400 of detecting a GNSS cyber-attack, according to an embodiment. As with the case described in FIG. 3, the method may be performed by a detection server.

At S410, a satellite's measurement data is collected from a ground-level GNSS sensor. The data collection is performed in a similar manner to the description of a single sensor outlined above in S310 of FIG. 3. Then, at S420, a nearby above-ground sensor is selected for satellite data to be collected, where the above-ground sensor statistically senses more satellites than the ground-level sensor. The selection of the sensors is based on the locations of the sensors and the distance between them. For example, the detection server can select the above-ground sensor that is closest in geometric distance, or closest in latitude and longitude distance (omitting the height axis). Also, the sensors are selected so that both the above-ground sensor and the ground-level sensor are sensing a similar sky environment as the ground-level sensor, that is, both sensors are receiving signals from the same satellites.

Once the data of both the ground-level sensor and the above ground sensor are at the detection server, the measurements of the ground-level sensor are compared to the measurements of the above-ground sensor, that latter of which is further away from the source of the cyber-attack. Next, at S430-S450, the verification and validation steps occur in a per-satellite manner. At S430, it is validated whether the SVID exists in both data sets. If the SVID does not exist in the above ground sensor data, then an attack is detected and the method 400 proceeds to S470. If the SVID exists in both data sets, the method 400 proceeds to S440.

At S440, the SNR of the satellite signal detected by the two sensors is received. Here, the relative distance between the two sensors and the respective satellite are compared. This is calculated based on the sensors' known locations, and the location of the satellite in orbit (which is also known based on the satellite's broadcasted information, which is pre-validated for correctness). Using this relative distance, the additional signal decay is calculated. For example, a free-space signal decay formula with the appropriate exponential decay may be used, based on the GNSS constellation frequency and respective environment. If the SNR of the signal collected by the ground-level sensor is higher than the SNR of the signal collected at the above ground sensor, minus the calculated additional signal decay and over a predefined threshold (for example 3 dB), then an attack is detected and the method 400 proceeds to S470. Otherwise, the method proceeds to S450.

At S450, the computed relative distance is used to compare the measured range of the two sensors from the satellite. If the difference between the measurements is higher than the calculated relative distance and over a predefined threshold (for example 30 meters), then an attack is detected, and the method proceeds to S470. Otherwise, if an attack was not detected, then the method 400 proceeds to S460, and the data is stored and incorporated into the statistics.

At S470, a list of GNSS devices is composed (i.e., extracted) based on the GNSS devices' periodic position update. Then, at S480, an alert on the cyber-attack is transmitted to the GNSS devices, including relevant information such as the SVID. This information assists the users of the GNSS devices to mitigate the impact of such attacks. In another embodiment, the cyber-attack detection is broadcasted over the cellular network as a broadcast message to the entire region where the cyber-attack was detected.

Figure 5:
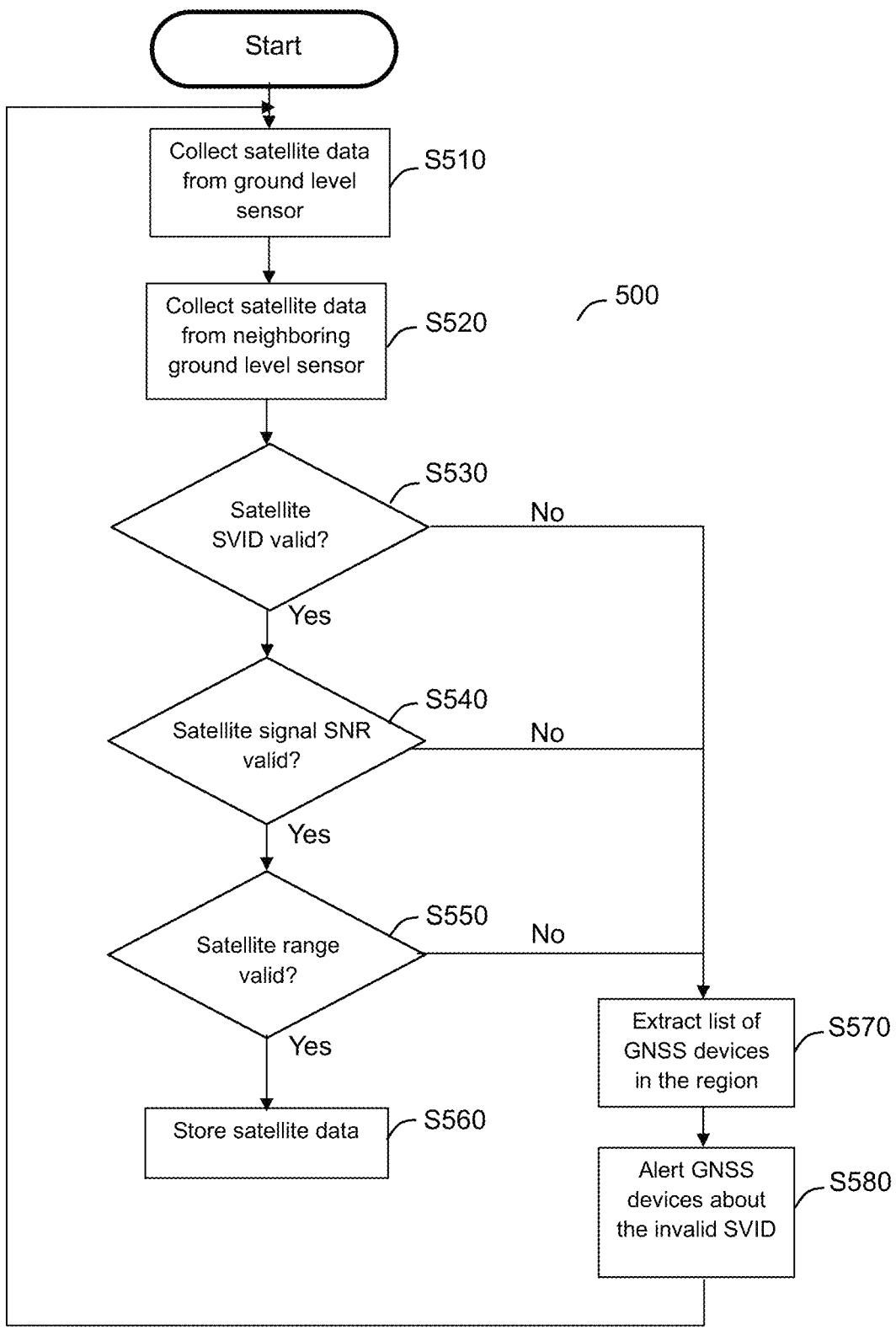
FIG. 5 is an example flowchart describing a method to detect GNSS cyber-attack using a ground-level sensor and another ground-level sensor in close vicinity, according to an embodiment.

FIG. 5 shows an example flowchart describing a method 500 to detect GNSS cyber-attack using a ground-level sensor and another ground-level sensor in close vicinity, according to an embodiment. In a similar manner as the method 400 described in FIG. 4, satellite data is collected from a neighboring sensor to the ground-level sensor. However, in this case, two or more ground-level sensors in close proximity are used. That is, at S510, measurement data is collected from a ground-level GNSS sensor. Here, data collection is performed in a similar manner as that of the single-sensor example described above in FIG. 3.

Then, at S520, another ground-level sensor is detected in the vicinity of the first sensor (which can be extended to the selection of multiple sensors). The selection method is based on the locations of the sensors and the distance between them. For example, the detection server can select the second ground-level sensor that is closest in geometric distance, or 'k' closest sensor (where 'k' is a predefined parameter, for example, k=3). In another embodiment, multiple sensors may be selected, and the average or mean values of the measurements may be determined.

Next, the measurements of the ground-level sensor are compared to the measurements of another sensor that is close by and also senses the same satellite and constellation environment, but is further away from the source of attack. Then, at S530, it is validated whether SVID exists in both data sets. If the SVID does not exist in one of the ground-level sensor data, then an attack is detected and the method 500 proceeds to S570. Otherwise, the method 500 proceeds to S540.

At S540, the SNR of the satellite signal received at the two ground-level sensors are compared. Here, the relative distance between the two sensors and the respective satellite is calculated. This is calculated based on the sensors' known locations, and the satellite location in orbit (which may be based on the satellite broadcast information that is pre-validated for correctness). Using this relative distance, additional signal decay may be calculated, for example, using the free-space signal decay formula with the appropriate exponential decay, based on the GNSS constellation frequency and respective environment. If the SNR at the first ground-level sensor is higher than the SNR at the second ground-level sensor, minus the calculated additional signal decay and over a predefined threshold (for example 3 dB), then an attack is detected and the method 500 proceeds to S570. Otherwise, the method 500 proceeds to S550.

At S550, the computed relative distance between the measured range of the two ground-level sensors to the satellite are compared. If the difference between the measurement is higher than the computed relative distance, over a predefined threshold (for example 30 meters) than an attack is detected and the method 500 proceeds to S570. Otherwise, if an attack was not detected, then the method proceeds to S560 and the data is stored and incorporated into the statistics.

At S570, a list of GNSS devices is composed (e.g., extracted), based on the GNSS devices' periodic position update. Then, at S580 an alert on the cyber-attack is transmitted to the GNSS devices, including relevant information such as the SVID. This information assists the user of the GNSS devices to mitigate the impact of such attacks. In another embodiment, the cyber-attack detection is broadcasted over the cellular network as a broadcast message to the entire region where the cyber-attack was detected.

In an embodiment, combinations of the methods 300-500 described in FIG. 3-5 are applicable as well for the detection of GNSS cyber-attacks. For example, the detection server 130 can apply all the methods, or specific set of methods. Here, the methods 300-500 may detect satellite-based cyber-attacks, such as those described above.

For example, the detection of a jamming attacks may be based on a sensor or several sensors in the same area that do not report on any satellite signal reception over a predefined time period (for example 30 seconds). In this case, the GNSS devices can conduct positioning calculation only when leveraging other positioning or localization techniques, such as vision-based localization (also known as Simultaneous Localization and Mapping—SLAM) or using Inertial Measurement Unit (IMU).

Figure 6:
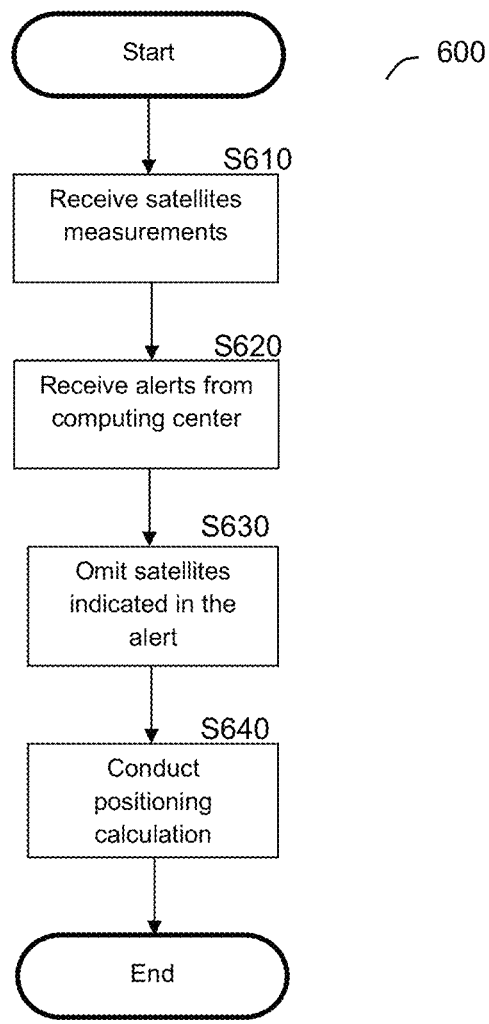
FIG. 6 is an example flowchart describing a method of mitigating the impact of a cyber-attack, according to an embodiment.

FIG. 6 shows an example flowchart 600 describing a method 600 of mitigating the impact of a cyber-attack, according to an embodiment. The method may be performed by a GNSS device, which receives GNSS signals and performs positioning calculation for any type of application (for example navigation or timing), and incorporates the alert information received from the detection server 130 to mitigate the impact of the cyber-attack. In an embodiment, and as may be performed by the GNSS device.

At S610, GNSS satellites measurement signals from a ground-level sensor are received. Such signals may indicate a constant operation mode. Then, at S620, the alert information is received from the detection server. The alert information may be generated as described in FIG. 3-5. Here, the alert information may be received based on querying the detection server, or receiving in a push manner information from the detection server.

In response to the received alert information, at S630, the measurements of satellites that are detected by the detection server alert, which are satellites signals that were detected and associated with the cyber-attack are omitted. Then, at S640 positioning calculation is performed with only the measurements of validated satellites.

Figure 7:
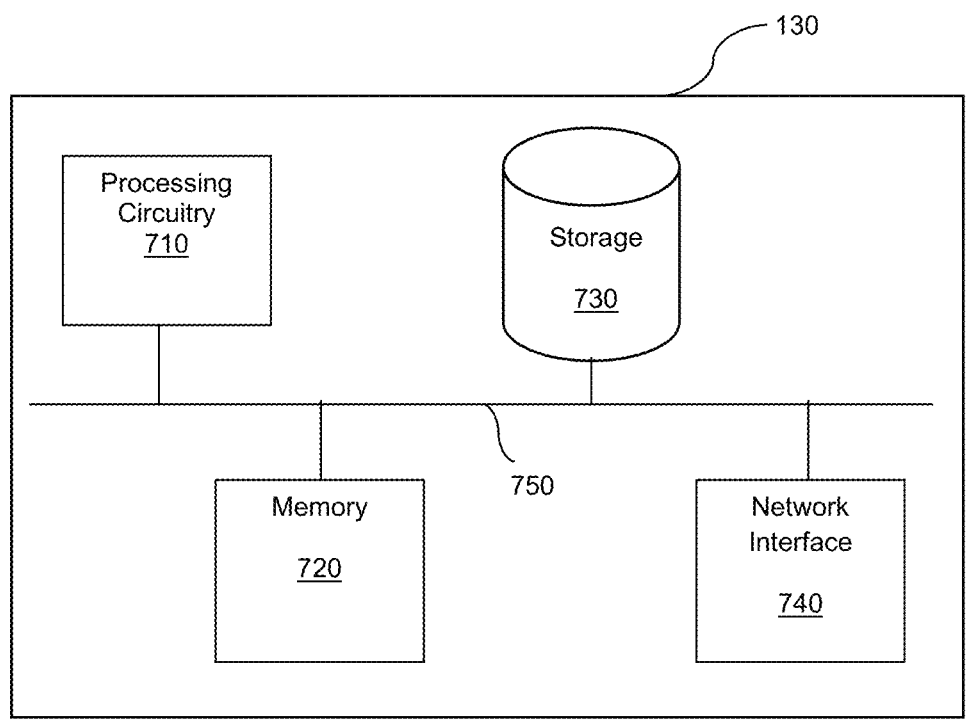
FIG. 7 is an example hardware block diagram depicting a detection server, according to an embodiment.

FIG. 7 is an example hardware block diagram depicting a detection server 130, according to an embodiment. The detection server 130 includes a processing circuitry 710 coupled to a memory 720, a storage 730, and a network interface 740. In an embodiment, the components of the detection server 130 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 may be magnetic storage, optical storage, and the like, and may be realized, for example, as flash memory or another memory technology, compact disk-read only memory (CD-ROM), Digital Versatile Disks (DVDs), or any other medium which can be used to store the desired information.

The network interface 740 allows the detection server 130 to communicate with the various components, devices, and systems described herein for network analysis, as well as other, like, purposes.

It should be understood that the embodiments described herein are not limited to the specific architecture illustrated in FIG. 7, and other architectures may be equally used without departing from the scope of the disclosed embodiments.

It should be noted that the computer-readable instructions may be construed broadly to mean any type of instructions, whether referred to as software, firmware, middleware, microcode, hardware description language, or otherwise. Instructions may include code, such as in source code format, binary code format, executable code format, or any other suitable format of code. The instructions, when executed by the circuitry, cause the circuitry to perform the various processes described herein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

What is claimed is:

1. A method for detecting cyber-attacks, comprising:
   obtaining satellite data for a location of a fixed, substantially ground-level sensor for at least one satellite that the ground-level sensor has visibility to, wherein the satellite data is derived by the ground-level sensor;
   obtaining satellite data for a location of a fixed, above-ground sensor, wherein the satellite data for the location of the above-ground sensor is derived by the above-ground sensor, the satellite data for the location of the above-ground sensor being for at least one satellite that the above-ground sensor has visibility to, the above-ground sensor being within a prescribed distance range to the ground-level sensor so that both the satellite data for the location of the above-ground sensor and the satellite data for the location of the ground-level sensor are at least from the at least one satellite; and
   when, based on the satellite data for both the location of the ground-level sensor and the location of the above-ground sensor, a determination is made that the obtained satellite data for the location of the ground-level sensor is
   invalid,
   (i) extracting a list of GNSS devices in a region where the ground-level sensor is deployed, and
   (ii) alerting each GNSS device in the list of GNSS devices on a potential cyber-attack.

2. The method of claim 1, further comprising:
   instructing a GNSS device to omit the received data from the at least one satellite and conduct positioning calculation after the omission.

3. The method of claim 1, wherein the obtained received satellite data includes at least one satellite parameter, wherein the at least one satellite parameter is one of: an ID of the least one satellite, a location of the satellite, an SNR of a signal of the satellite, or a range measurement to the satellite.

4. The method of claim 3, wherein the
   determination is further based on a validity status of each of the at least one satellite parameter of a respective one of the at least one satellite.

5. The method of claim 3, wherein making the determination comprises comparing each of the at least one satellite parameter of each the respective one of the at least one satellite to a respective previously collected corresponding historical satellite parameter.

6. The method of claim 1, wherein if the satellite data for both the location of the ground-level sensor and the location of the above-ground sensor is determined to be invalid based further on satellite data derived at at least one other ground-level sensor that is located within a prescribed distance of the ground-level sensor.

7. The method of claim 1, wherein if the satellite data for both the location of the ground-level sensor and the location of the above-ground sensor is determined to be invalid based further on satellite data derived at at least one other above-ground sensor that is located within a prescribed distance of the ground-level sensor.

8. The method of claim 1, wherein:
if the satellite data for both the location of the ground-level sensor and the location of the above-ground sensor is determined to be invalid further based on satellite data derived for at least one additional satellites orbiting satellite that the ground-level sensor has visibility to.

9. The method of claim 1, wherein the detected cyber-attack is any one of:
jamming, satellite injection, and satellite spoofing.

10. The method of claim 1, further comprising:
instructing each of the alerted GNSS devices to mitigate the potential cyber-attack.

11. A non-transitory computer readable medium having stored thereon instructions for causing a processing circuitry to execute a process, the process comprising:
obtaining satellite data for a location of a fixed, substantially ground-level sensor for at least one satellite that the ground-level sensor has visibility to, wherein the satellite data is derived by the ground-level sensor;
obtaining satellite data for a location of a fixed, above-ground sensor, wherein the satellite data for the location of the above-ground sensor is derived by the above-ground sensor, the satellite data for the location of the above-ground sensor being for at least one satellite that the above-ground sensor has visibility to, the above-ground sensor being within a prescribed distance range to the ground-level sensor so that both the satellite data for the location of the above-ground sensor and the satellite data for the location of the ground-level sensor are at least from the at least one satellite; and
when, based on the satellite data for both the location of the ground-level sensor and the location of the above-ground sensor, a determination is made that the obtained satellite data for the location of the ground-level sensor is
invalid,
(i) extracting a list of GNSS devices in a region where the ground-level sensor is deployed, and
(ii) alerting each GNSS device in the list of GNSS devices on a potential cyber-attack.

12. A system for detecting cyber-attacks, comprising:
a processing circuitry; and
a memory, the memory containing instructions that, when executed by the processing circuitry, configure the system to:
obtain satellite data for a location of a fixed, substantially ground-level sensor for at least one satellite that the ground-level sensor has visibility to, wherein the satellite data is derived by the ground-level sensor;
obtain satellite data for a location of a fixed, above-ground sensor, wherein the satellite data for the location of the above-ground sensor is derived by the above-ground sensor, the satellite data for the location of the above-ground sensor being for at least one satellite that the above-ground sensor has visibility to, the above-ground sensor being within a prescribed distance range to the ground-level sensor so that both the satellite data for the location of the above-ground sensor and the satellite data for the location of the ground-level sensor are at least from the at least one satellite; and
when, based on the satellite data for both the location of the ground-level sensor and the location of the above-ground sensor, a determination is made that the obtained satellite data for the location of the ground-level sensor is
invalid,
(i) extract a list of GNSS devices in a region where the ground-level sensor is deployed, and
(ii) alert each GNSS device in the list of GNSS devices on a potential cyber-attack.

13. The system of claim 12, wherein further comprising:
instructing a GNSS device to omit the received data from the at least one satellite and conduct positioning calculation after the omission.

14. The system of claim 12, wherein the obtained satellite data includes at least one satellite parameter, wherein the at least one satellite parameter is one of: an ID of the least one satellite, a location of the satellite, an SNR of a signal of the satellite, or a range measurement to the satellite.

15. The system of claim 14, wherein the
determination is further based on a validity status of each of the at least one satellite parameter of a respective one of the at least one satellite is invalid.

16. The system of claim 14, wherein the system is further configured to, in making the determination, compare each of the at least one satellite parameter of each the respective one of the at least one satellite to a respective previously collected corresponding historical satellite parameter.

17. The system of claim 12, wherein the satellite data for both the location of the ground-level sensor and the location of the above-ground sensor is determined to be invalid based further on satellite data derived at at least one other ground-level sensor that is located within a prescribed distance of the ground-level sensor.

18. The system of claim 12, wherein the satellite data for both the location of the ground-level sensor and the location of the above-ground sensor is determined to be invalid based further on satellite data derived at at least one other above-ground sensor that is located within a prescribed distance of the ground-level sensor.

19. The system of claim 12, wherein determining if the satellite data for both the location of the ground-level sensor and the location of the above-ground sensor is invalid is further based on satellite data derived for at least one additional orbiting satellite that the ground-level sensor has visibility to.

20. The system of claim 12, wherein the detected cyber-attack is any one of:
jamming, satellite injection, and satellite spoofing.

* * * * *